United States Patent
Yamamoto

(10) Patent No.: US 6,907,139 B2
(45) Date of Patent: Jun. 14, 2005

(54) THREE-DIMENSIONAL IMAGE CAPTURING DEVICE

(75) Inventor: Kiyoshi Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 646 days.

(21) Appl. No.: 09/933,761

(22) Filed: Aug. 22, 2001

(65) Prior Publication Data

US 2002/0041704 A1 Apr. 11, 2002

(30) Foreign Application Priority Data

Aug. 24, 2000 (JP) ...................................... P2000-254330

(51) Int. Cl.⁷ ................................................. G06K 9/00
(52) U.S. Cl. ..................... 382/154; 382/106; 382/108; 382/293; 348/44; 348/47
(58) Field of Search ................................. 382/106, 108, 382/154, 291, 293; 348/42–44, 46–48

(56) References Cited

U.S. PATENT DOCUMENTS 4,573,191 A * 2/1986 Kidode et al. .............. 382/106

OTHER PUBLICATIONS

Christie et al., "Design and development of a multi-detecting two-dimensional ranging sensor", Measurement Science and Technology, vol. 6, 1995 (IOP Publishing Ltd.) pp. 1301–1308.

* cited by examiner

*Primary Examiner*—Jon Chang
*Assistant Examiner*—Charles Kim
(74) *Attorney, Agent, or Firm*—Greenblum & Bernstein, P.L.C.

(57) ABSTRACT

A three-dimensional image-capturing device comprises a first and second CCD and a first and second photographing lens. The texture or still image of a subject is captured by the first CCD through the first photographing lens. The distance image of which pixel data represents distance information from the device to each point on the surface of the subject is sensed by the second CCD through the second photographing lens. The three-dimensional coordinate data of each point on the surface of the subject is calculated from the distance information. The parallax between the first and second photographing lenses is compensated for with reference to the three-dimensional coordinate data of the subject.

5 Claims, 5 Drawing Sheets

THREE-DIMENSIONAL IMAGE CAPTURING DEVICE

BACKGROUND OF THE INVENTION

1. Field of the Invention

The present invention relates to a three-dimensional image-capturing device by which the three-dimensional shape and texture of a measurement subject are captured.

2. Description of the Related Art

A three-dimensional image-capturing device, which detects the three-dimensional shape and texture of a measurement subject, is proposed. The three-dimensional image-capturing device sequentially captures a distance image, which represents the three-dimensional shape of the subject, and a texture image in a single image-capturing system; i.e. a unit of an optical system and an image sensor.

However, in this type of three-dimensional image-capturing device, the image-capturing operations are cumbersome, since the distance image capturing operation and the texture image capturing operation are considerably different from each other. Further, it requires time for capturing a pair of distance and the texture images. Furthermore, since the distance image and the texture image are captured sequentially, it is impossible to obtain the distance image and the texture image simultaneously.

SUMMARY OF THE INVENTION

Therefore, an object of the present invention is to provide a three-dimensional image-capturing device that is able to obtain a pair of distance and texture images simultaneously through a biaxial or twin lens system, in which the optical systems are individually prepared for each purpose. Further, the object of the present invention is to provide a three-dimensional image-capturing device that can compensate for the distance image and the texture image.

According to the present invention, a three-dimensional image-capturing device is provided that comprises first and second image sensors, first and second optical systems, a texture image capturing processor, a three-dimensional measuring processor, and a parallax compensation processor.

The texture image capturing processor captures a still image of a subject in the first image sensor through the first optical system and the three-dimensional measuring processor measures distance information about the subject for each pixel of the second image sensor through the second optical system. The parallax compensation processor compensates for parallax between the first optical system and the second optical system by using the distance information.

Preferably, the device may further comprise a three-dimensional coordinate data generating processor. The three-dimensional coordinate data generating processor generates three-dimensional coordinate data by calculating three-dimensional coordinates for each point on the subject corresponding to each pixel of the second image sensor from the distance information. The parallax is compensated for by using the above three-dimensional coordinate data.

In the first place, the three-dimensional coordinates may be calculated in a second coordinate system, and then transformed to three-dimensional coordinates in a first coordinate system of which the origin is set at the focal point of the first optical system. In this case, the origin of the second coordinate system may be set at the focal point of the second optical system.

The parallax compensation processor may also execute a projection of each point on the subject corresponding to each pixel of the second image sensor onto the imaging surface of the first image sensor, so that a correspondence between pixels of the first and second image sensor is obtained. The projection is based on three-dimensional coordinates of each point on the subject, which are represented in the first coordinate system.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
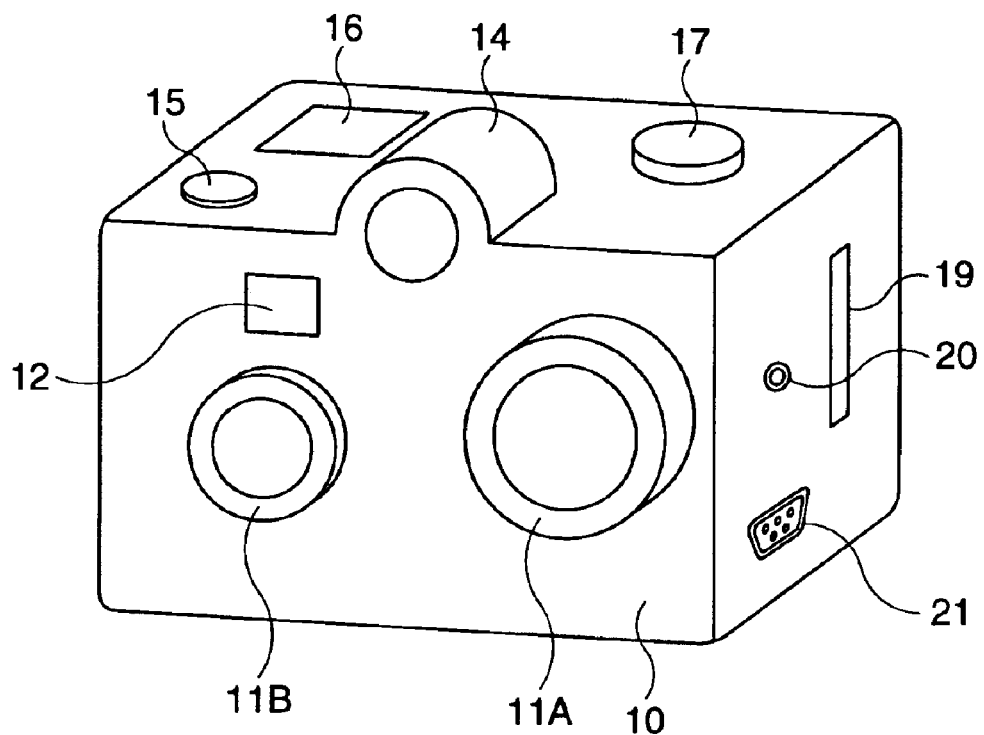
FIG. 1 is a perspective view showing a camera provided with a three-dimensional image-capturing device of the present embodiment of the present invention.

The present invention is described below with reference to the embodiments shown in the drawings.

FIG. 1 is an external view of a camera-type three-dimensional device of a first embodiment of the present invention. With reference to FIG. 1, the three-dimensional device of the first embodiment is explained.

On a front surface of a camera body 10, a photographing lens (first optical system) 11A, for capturing a texture image or a normal still video image of a subject, a photographing lens (second optical system) 11B, for detecting the distance information of the subject, and a viewfinder window 12 are provided. A good example of a texture image is a superfine color image. The distance information is detected for each of the image pixels so that the information can be regarded as a distance image, as will be discussed later. In the middle of the upper surface of the camera body 10, a light-emitting device (light source) 14, which radiates a laser beam, is mounted. A release switch 15 and a liquid crystal display panel 16 are provided on the left side of the light-emitting device 14 and a mode change dial 17 is provided on the right side of the device 14. On a side surface of the camera body 10, a card slot 19 is formed, into which a recording medium, such as an IC memory card, is insertable. A video output terminal 20 and an interface connector 21 are also provided on the side surface.

Figure 2:
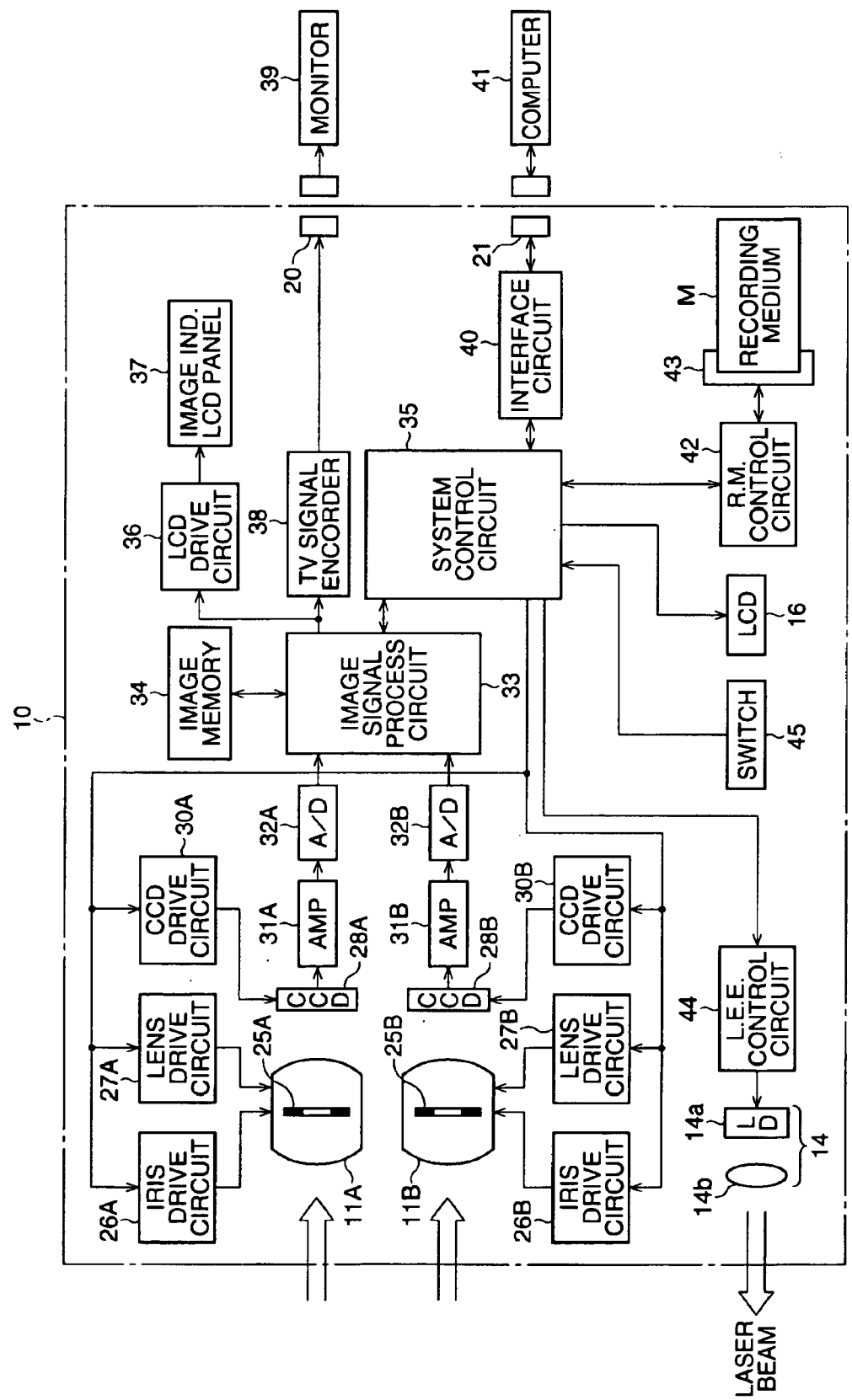
FIG. 2 is a block diagram showing an electrical construction of the camera shown in FIG. 1.

FIG. 2 is a block diagram showing an electrical construction of the camera of FIG. 1.

An aperture 25A is provided in the photographing lens 11A. The opening degree of the aperture 25A is adjusted by an iris drive circuit 26A. A focusing operation and a zoom operation of the photographing lens 11A are controlled by a lens drive circuit 27A. Similarly, an aperture 25B is provided in the photographing lens 11B and the opening degree of the aperture 25B is adjusted by an iris drive circuit 26B. Further, a focusing operation and a zoom operation of the photographing lens 11B are controlled by a lens drive circuit 27B.

A CCD (first image sensor) 28A for capturing a color still image is disposed on the optical axis of the photographing lens 11A. Furthermore, on the optical axis of the photographing lens 11B, a CCD (second image sensor) 28B is disposed. The CCD 28B detects reflecting light of a laser beam that is emitted from the light-emitting device and reflected by the subject. Subject images are formed on both the light-receiving surfaces of the CCDs 28A and 28B through the photographing lenses 11A and 11B, and an electric charge corresponding to the subject images is generated therein. An operation, such as an accumulating operation and a reading operation of the electric charge of the CCD 28A and 28B, is controlled by CCD drive pulse signals fed from a system control circuit 35 to the CCD drive circuits 30A and 30B. Electric charge signals, i.e., image signals, read from the CCDs 28A and 28B are amplified by amplifiers 31A and 31B, and are converted from analog signals to digital signals by A/D converters 32A and 32B. The digital image signals from A/D converters 32A and 32B are respectively subjected to a process, such as a gamma correction, in the image-signal process circuit 33, and is stored as digital image data in an image memory 34. The iris drive circuits 26A and 26B, the lens drive circuits 27A and 27B, the CCD drive circuits 30A and 30B, and the image-signal process circuit 33 are controlled by a system control circuit 35.

The digital image data are read from the image memory 34 and supplied to an LCD drive circuit 36, which is operated in accordance with the digital image data, so that an image corresponding to the digital image data is displayed on an image indicating LCD panel 37. Further, an image processed in the system control circuit 35 can be displayed on the image indicating LCD panel 37.

The digital image data read from the image memory 34 is also transmitted to a TV signal encoder 38, so that the digital image data can be transmitted to a peripheral monitor device 39, provided externally to the camera body 10, through the video output terminal 20. The system control circuit 35 is connected to an interface connector 21 via an interface circuit 40. Therefore, the digital image data read from the image memory 34 can also be transmitted to a computer 41 connected to the interface connector 21 via an interface cable. Further, the system control circuit 35 is connected to an image-recording device 43 through a recording medium control circuit 42. Therefore, the digital image data read from the image memory 34 can be recorded in a recording medium M, such as an IC memory card, mounted in the image recording device 43.

A light emitting element control circuit 44 is connected to the system control circuit 35. The light-emitting device 14 is provided with a light-emitting element, such as laser diode (LD) 14a, land an illumination lens 14b. The operation of the light emitting element 14a is controlled by the light emitting element control circuit 44. The light emitting element 14a radiates a laser beam as a distance measuring light beam. The laser beam irradiates the entire measurement subject through the illumination lens 14b. The laser beam reflected by the measurement subject becomes incident on the photographing lens 11B. By detecting the reflected laser beam with the CCD 28B, information relating to the distance from the camera to the measurement subject is sensed at each pixel of the CCD 28 as an image signal. As will be discussed later, the distance from the camera 10 to the measuring subject that corresponds to each of the pixels in the CCD 28B is derived for this image signal.

A switch group 45, including the release switch 15 and the mode change dial 17, and the liquid crystal display panel (indicating device) 16 are connected to the system control circuit 35.

Figure 3:
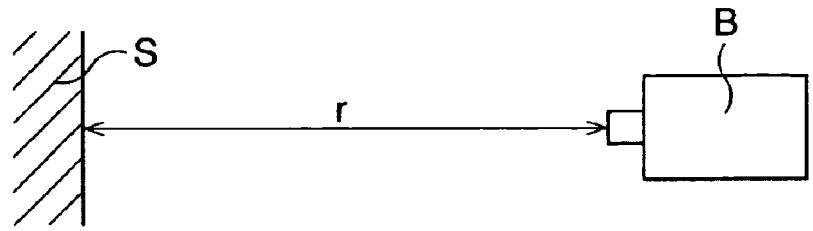
FIG. 3 is a view showing the principle behind distance measurement.
Figure 4:
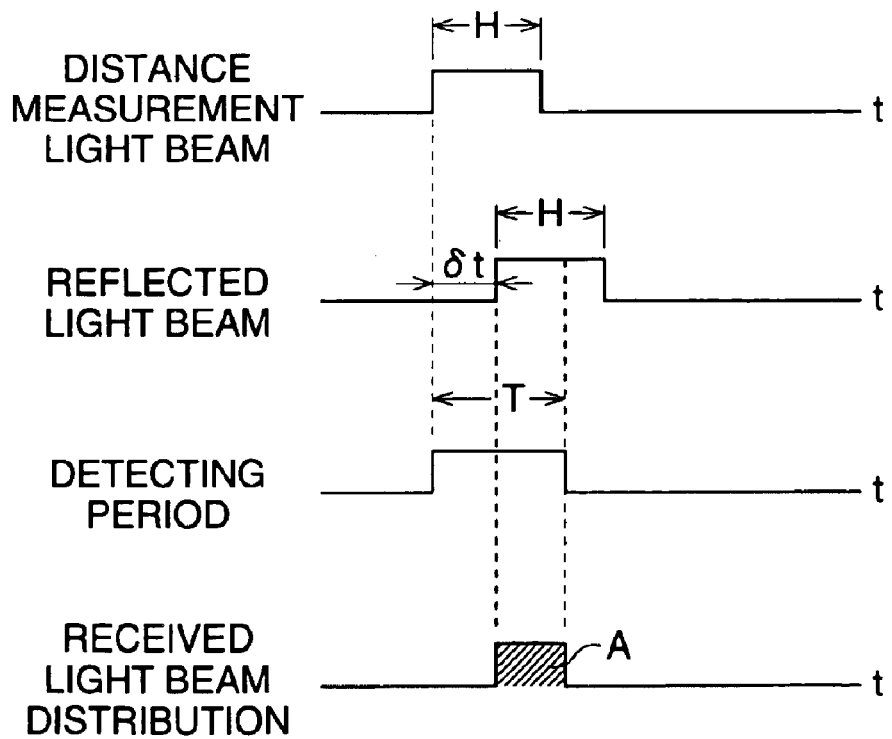
FIG. 4 is a timing chart showing a distance measurement light beam, reflected light beam, a gate pulse, and the distribution of the accumulated amount of light received by a CCD.

With reference to FIGS. 3 and 4, the principle behind the distance measurement in the embodiment is described below. Note, in FIG. 4, the abscissa indicates time "it".

A distance measuring light beam output by a distance measurement device B is reflected by the measurement subject S, and the reflected light beam is sensed by a CCD (not shown). The distance measuring light beam is a pulse, the width of which is "H". Accordingly, the reflected light beam is a pulse, the width of which is "H", similar to the distance measuring light beam. Therefore, a rise of the pulse of the reflected light beam occurs after a rise of the pulse of the distance measuring light beam by time δ·t (δ is a delay coefficient). Since the distance-measuring light beam and the reflected light beam have both traveled a distance "r" between the distance measurement device B and the measured subject S, the distance "r" is represented as follows:

$$r = \delta \cdot t \cdot C / 2 \qquad (1)$$

wherein "C" is the speed of light.

For example, by setting a condition in such a manner that the reflected light beam can only be sensed from the point where there is a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

By taking advantage of the principle described above, the three-dimensional measurement of the present embodiment is carried out in accordance with the received light amount A sensed in each of the photo-diodes which are two-dimensionally disposed on the CCD 28. Namely, from the received light amount A detected in each of the photodiodes or pixels, the distance from the camera body 10 to each point on the surface of the measurement subject S is sensed as an image signal (distance image) for each of the photodiodes or pixels. Thus, the distance data, which indicates the topography of the measurement subject S, is obtained from the image signal for each of the photodiodes or pixels.

Figure 5:
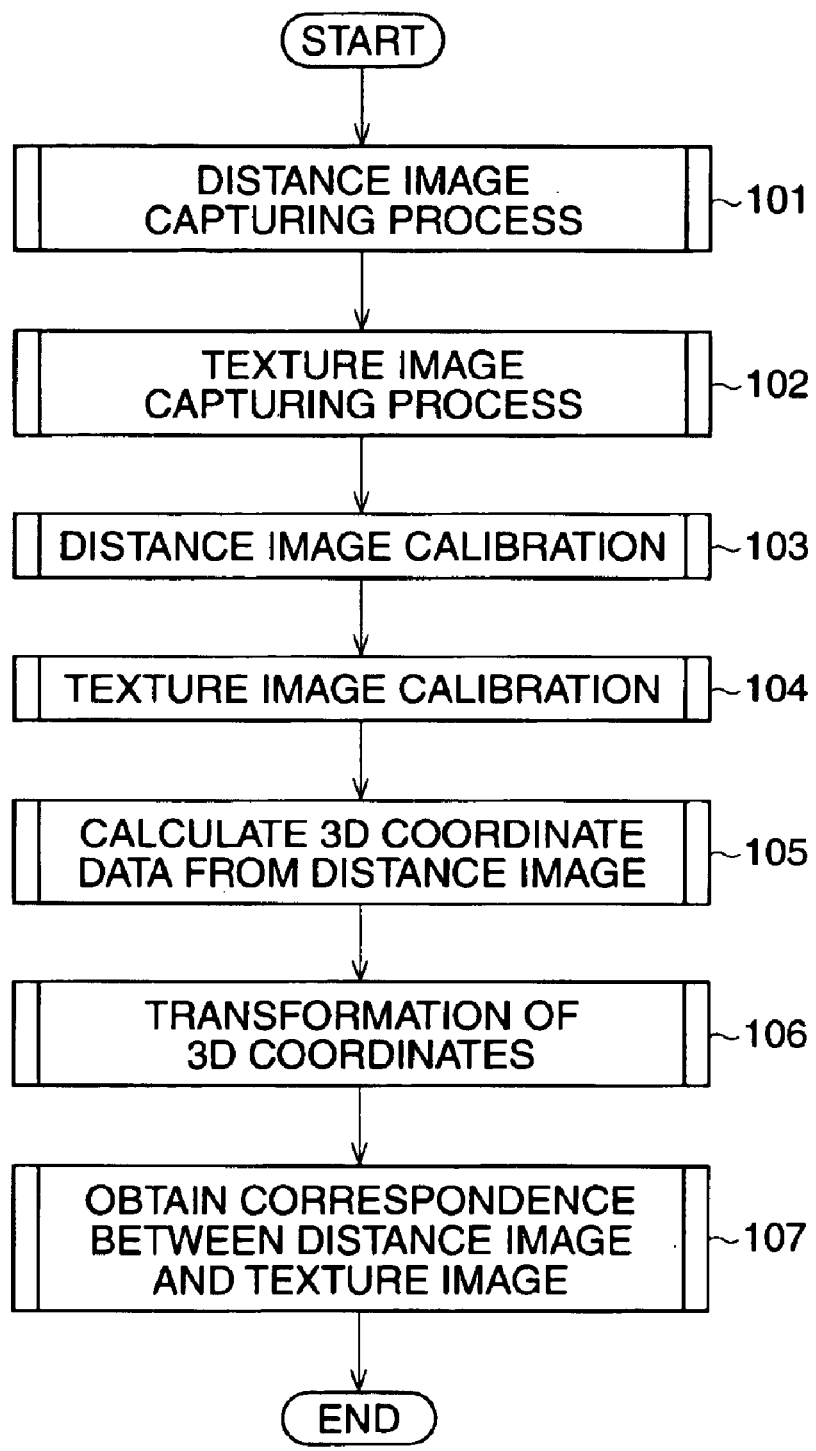
FIG. 5 show a flowchart of the process carried out in the camera.

With reference to FIG. 5, a parallax compensation process for a gap between the texture image and the distance image of the subject is explained. The texture image is sensed in the first image-capturing system that comprises the photographing lens 11A and the CCD 28A. The distance image is sensed in the second image-capturing system that comprises the photographing lens 11B and the CCD 28B. FIG. 5 illustrates a flow chart of the entire process executed in the camera type three-dimensional image-capturing device of the present embodiment.

The process represented by the flow chart of FIG. 5 starts when the release switch 15 is fully depressed. Namely, when the release switch 15 is fully depressed, Step 101 is executed so that the three-dimensional measurement, which is based on the principle of the distance measurement described with reference to FIGS. 3 and 4, is carried out by utilizing the light-emitting device 14 and CCD 28B of the second image-capturing system. By this, distance information about the measurement subject, which corresponds to each of the pixels in CCD 28B, is sensed as a distance image, and temporarily stored in the image memory 34 (distance image capturing process). The capturing process for the texture image is then carried out in Step 102. Namely, the texture image or normal still image of the subject is captured by the normal still video control of the CCD 28A, which is settled in the first image-capturing system. The captured texture image is temporarily stored in the image memory 34 (texture image capturing process).

In Step 103, the calibration for the distance image sensed in Step 101 is executed. Namely, distortion due to the second optical system or the photographing lens 11B is corrected. Similarly, in Step 104, the calibration for the texture image sensed in Step 102 is executed, so that distortion due to the first optical system or the photographing lens 11A is corrected.

In Step 105, the distance from the camera body 10 to each point on the measurement subject, which corresponds to each pixel of the calibrated distance image, is calculated. Accordingly, the three-dimensional coordinate data of the measurement subject for each of the pixels is derived from the above distance. As it will be discussed later, the three-dimensional coordinate data, obtained in Step 105, may be expressed in the coordinate system for which the origin of the coordinate axes is set to the focal point $O_B$ of the second image-capturing system (refer FIG. 6). In Step 106, the three-dimensional coordinate data of the measurement subject, which is obtained in Step 105, is transferred to the coordinate system for which the origin of the coordinate axes is set to the focal point $O_A$ of the first image-capturing system (refer FIG. 6). Note that, the three-dimensional coordinate data corresponding to each of the pixels can be computed from the camera angle of view across the width and length of the second image-capturing system and the position of the pixel in the imaging surface of the CCD 28B.

In Step 107, the correspondence of the pixels in the distance image to the pixels in the texture image is obtained with reference to the post-transferred three-dimensional coordinate data of the measurement subject. Namely, a position represented by three-dimensional coordinates that corresponds to each of the pixels in the distance image, the coordinates of which originate at the focal point $O_A$, is projected on the imaging surface of the CCD 28A, and then the corresponding pixel of the texture image is obtained. Accordingly, the correspondence between the pixels of the distance image and the texture image is achieved. The distance image is recorded in the recording medium M together with the corresponding texture image, and then the process is terminated.

Figure 6:
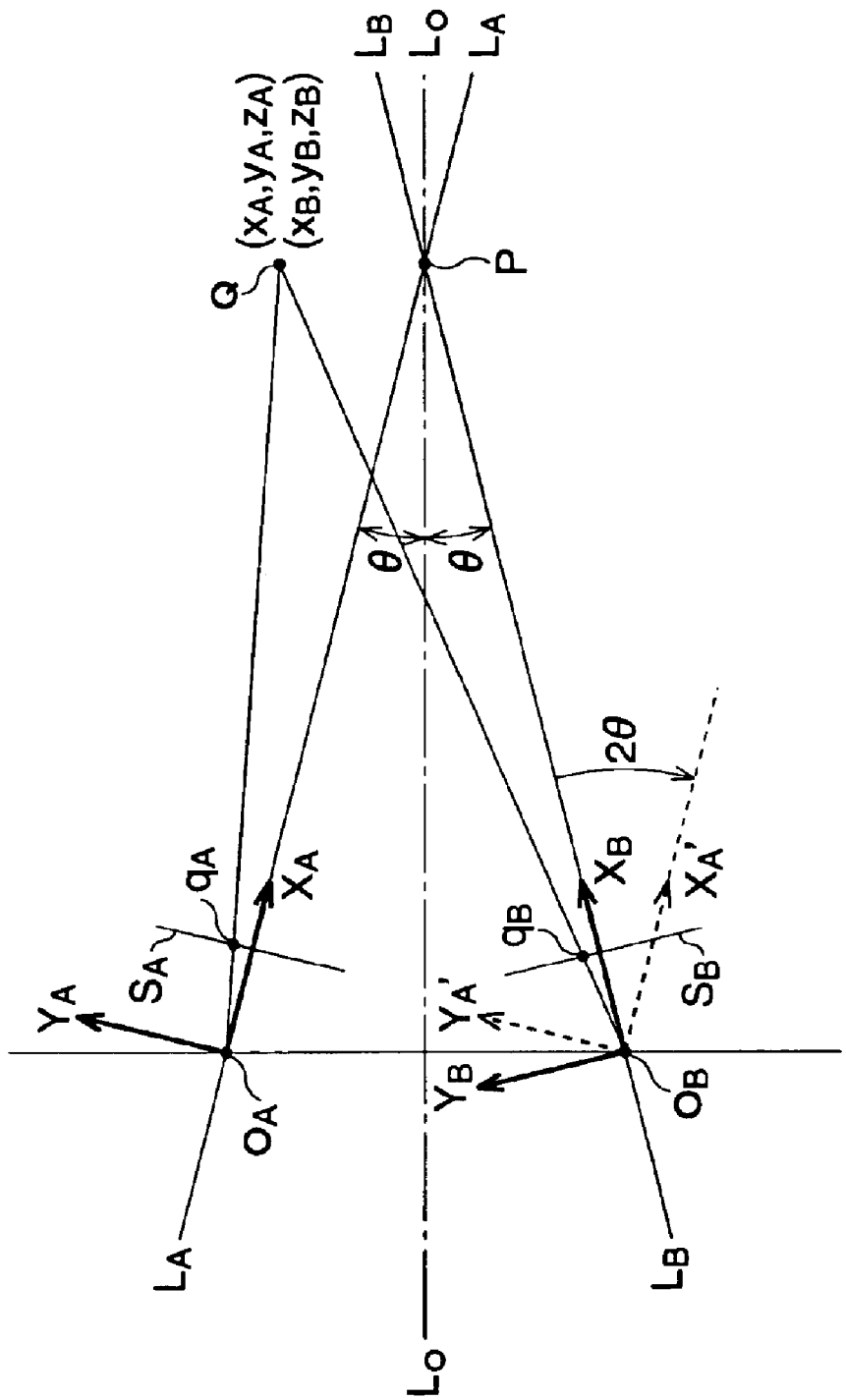
FIG. 6 schematically illustrates the arrangement of the first and second image-capturing systems.

With reference to FIG. 6, the coordinates transfer process executed in the parallax compensation process in the present embodiment is explained. FIG. 6 schematically illustrates the arrangement of the first and second image-capturing systems.

As shown in FIG. 6, in the present embodiment, the first and second image-capturing systems are arranged so that the respective optical axes $L_A$ and $L_B$ of the units intersect at a point P which is positioned at a predetermined distance from the camera. The distance image capturing and the texture image capturing are carried out on condition that the subject is arranged in the vicinity of the point P. The point P is on the line $L_O$, which is a perpendicular bisector of the segment $O_A O_B$ between the focal points $O_A$ and $O_B$. Namely, the optical axes $L_A$ and $L_B$ intersect with the line $L_O$ at an angle θ.

In FIG. 6, the focal point $O_A$ is the origin of the first coordinate system or the first Cartesian coordinates ($X_A, Y_A, Z_A$) and the focal point $O_B$ is the origin of the second coordinate system or the second Cartesian coordinates ($X_B, Y_B, Z_B$). The first Cartesian coordinates ($X_A, Y_A, Z_A$) are a right-handed coordinate system, wherein the coordinate axis $X_A$ is identical to the optical axis $L_A$ and the coordinate axis $Z_A$ is perpendicular to the surface of the figure in the upward direction. Similarly, the second Cartesian coordinates ($X_B, Y_B, Z_B$) are a right-handed coordinate system, wherein the coordinate axis $X_B$ is identical to the optical axis $L_B$ and the coordinate axis $Z_B$ is perpendicular to the surface of the figure in the upward direction.

The distance data for each pixel of the CCD 28B, which is obtained by the distance measurement or three-dimensional measurement through the second optical system, is transformed to the three-dimensional coordinate data which is represented by the second Cartesian coordinates ($X_B, Y_B, Z_B$) for which the origin is at the focal point $O_B$. For example, a point Q on the surface of the subject that corresponds to the point $q_B$ of the image capturing surface $S_B$ of the second image-capturing system, is indicated by the three-dimensional coordinate data ($X_B, Y_B, Z_B$) of the second coordinates ($X_B, Y_B, Z_B$).

The coordinate data ($X_B, Y_B, Z_B$) can be transformed to the coordinate data of the first Cartesian coordinates ($X_A, Y_A, Z_A$) by means of coordinates transformations, such as the 2θ rotation of the second coordinates ($X_B, Y_B, Z_B$) around the coordinate axis $Z_B$, toward the clockwise direction in the figure, and the succeeding translation of the focal point $O_B$ to the focal point $O_A$. So that, when the coordinates obtained after the above rotation of the second coordinates ($X_B, Y_B, Z_B$) are denoted as ($X_A', Y_A', Z_A'$), and the three-dimensional coordinate data of the point Q in the coordinates ($X_A', Y_A', Z_A'$) are denoted as ($X_A', Y_A', Z_A'$), the three-dimensional coordinates ($X_A, Y_A, Z_A$) of the point Q in the first three-dimensional coordinates ($X_A, Y_A, Z_A$) are represented by the following equation;

$$\begin{pmatrix} x_A \\ y_A \\ z_A \end{pmatrix} = R \begin{pmatrix} x_B \\ y_B \\ z_B \end{pmatrix} + \begin{pmatrix} \Delta X \\ \Delta Y \\ \Delta Z \end{pmatrix} = \begin{pmatrix} x_A' + \Delta X \\ y_A' + \Delta Y \\ x_A' + \Delta Z \end{pmatrix}, \quad (2)$$

wherein R is the rotation matrix that represents the above 2θ rotation around the coordinate axis $Z_B$ and ($\Delta X, \Delta Y, \Delta Z$) represents the vector from the focal point $O_B$ to the focal point $O_A$.

The correspondence between the point $q_A$ on the image-capturing surface $S_A$ of the first image-capturing system and the point $q_B$ on the image-capturing surface $S_B$ of the second image-capturing system is obtained by determining the position of the point $q_A$ from the coordinate data ($X_A, Y_A, Z_A$) derived by equation (2). As a result, the correspondence between the distance image and the texture image is obtained (Step 107).

Note that, in FIG. 6, although the optical axes $L_A$ and $L_B$ are illustrated as a straight line for convenience, the substantial optical axes $L_A$ and $L_B$ may be bent in the first and second image-capturing optical system.

The distortion of the first and second optical system, the arrangement of the first and second optical system, and the arrangement of the image-capturing surface and the focal point were previously fixed. Therefore the parameters required for the calibrations, the coordinate transformations and the projection of the three-dimensional coordinate data onto the image-capturing surfaces were previously stored in memory. Namely, the above processes were carried out in accordance with these parameters.

As described above, according to the present embodiment, the parallax in the distance image and the texture image, which are individually captured through the respective first and second optical systems, can be compensated.

In the present embodiment, the optical axes of the first and second optical systems are arranged so as to intersect with each other. The intersection of the axes is not necessary, although the axes should be trained on the same subject. For example, the optical axes may be disposed parallel to each other. When the axes are parallel, only the translation operation is required for the above coordinates transformation and the rotation is not required. Namely, the transformation becomes easier.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-254330 (filed on Aug. 24, 2000) which is expressly incorporated herein, by reference, in its entirety.

What is claimed is:

1. A three-dimensional image-capturing device, comprising:

first and second image sensors;

first and second optical systems;

a texture image capturing processor that captures a still image of a subject by said first image sensor through said first optical system;

a three-dimensional measuring processor that measures distance information about said subject for each pixel of said second image sensor through said second optical system;

a parallax compensation processor that compensates for parallax between said first optical system and said second optical system by said distance information; and a three-dimensional coordinate data generating processor that generates three-dimensional coordinate-data by calculating three-dimensional coordinates for each point on said subject corresponding to said each pixel of said second image sensor from said distance information, and said parallax is compensated for by utilizing said three-dimensional coordinate data, wherein said parallax compensation processor calculates said three-dimensional coordinates in a second coordinate system, and then transfers said three-dimensional coordinates to a first coordinate system for which the origin is set at the focal point of said first optical system.

2. A device according to claim 1, wherein the origin of said second coordinate system is set at the focal point of said second optical system.

3. A device according to claim 1, wherein said parallax compensation processor further processes a projection of each point on said subject corresponding to said each pixel of said second image sensor onto the imaging surface of said first image sensor, so that a correspondence between pixels of said first image sensor and said second image sensor is obtained.

4. A device according to claim 3, wherein said projection is based on three-dimensional coordinates of said each point on said subject, which are represented in said first coordinate system.

5. A device according to claim 1, wherein said parallax compensation processor compensates for said parallax by means of projecting each point on said subject corresponding to said each pixel of said second image sensor onto the imaging surface of said first image sensor, so that a correspondence between the pixels of said first image sensor and second image sensor is obtained.

* * * * *